(12) United States Patent
Mäkitalo

(10) Patent No.: US 7,195,254 B2
(45) Date of Patent: Mar. 27, 2007

(54) ADJUSTABLE SKI FOR A SNOWMOBILE

(75) Inventor: Kalevi Mäkitalo, Saarenkyiä (FI)

(73) Assignee: BRP Finland Oy, Rovaniemi (FI)

( * ) Notice: Subject to any disclaimer, the term of this patent is extended or adjusted under 35 U.S.C. 154(b) by 0 days.

(21) Appl. No.: 10/404,649

(22) Filed: Apr. 2, 2003

(65) Prior Publication Data

US 2003/0189302 A1    Oct. 9, 2003

Related U.S. Application Data

(60) Provisional application No. 60/369,602, filed on Apr. 4, 2002.

(51) Int. Cl.
*B62B 9/04* (2006.01)
(52) U.S. Cl. .......................... 280/28; 280/22; 280/22.1
(58) Field of Classification Search ............ 280/28.11, 280/28, 21.1, 28.14, 22, 22.1, 28.16, 601, 280/609, 28.15; 180/190, 191, 182, 180
See application file for complete search history.

(56) References Cited

U.S. PATENT DOCUMENTS

| | | | | |
|---|---|---|---|---|
| 2,532,887 A | * | 12/1950 | Bor ........................... | 280/22.1 |
| 2,620,199 A | * | 12/1952 | Maly et al. ................. | 280/22.1 |
| 3,145,030 A | * | 8/1964 | Millis ........................ | 280/22.1 |
| 3,361,436 A | * | 1/1968 | Williams .................... | 280/22.1 |
| 3,643,978 A | * | 2/1972 | Westberg ..................... | 280/28 |
| 3,675,939 A | * | 7/1972 | Vik ............................. | 280/28 |
| 3,844,367 A | * | 10/1974 | Flohr .......................... | 280/28 |
| 5,443,278 A | | 8/1995 | Berto | |
| 6,276,699 B1 | * | 8/2001 | Simmons et al. ............. | 280/28 |
| 6,692,009 B2 | * | 2/2004 | Lemieux ...................... | 280/28 |

* cited by examiner

*Primary Examiner*—Hau Phan
(74) *Attorney, Agent, or Firm*—Osler, Hoskin & Harcourt LLP

(57) ABSTRACT

A snowmobile ski includes an elongate ski element. The elongate ski element has a tip and a tail defining a length therebetween, top and bottom surfaces, first and second lateral edges extending longitudinally between the tip and the tail defining a width therebetween, and an attachment flange extending upwardly from the top surface. At least one lateral extension element is detachably secured to one of the lateral edges to thereby increase the lateral width of the snowmobile ski.

16 Claims, 2 Drawing Sheets

ADJUSTABLE SKI FOR A SNOWMOBILE

CROSS REFERENCE TO RELATED APPLICATION

This application is related to and claims priority to U.S. Provisional Patent Application Ser. No. 60/369,602, which was filed on Apr. 4, 2002. The entirety of the subject matter of that application is incorporated by reference herein.

FILED OF THE INVENTION

This invention relates to snowmobiles. In particular, this invention relates to snowmobile skis.

BACKGROUND OF THE INVENTION

There are three riding situations in which snowmobiles are commonly used: (1) trail riding, (2) mountain riding, and (3) utility riding.

Trail riding is typically performed on packed trails, which may or may not be groomed. As the snowmobile travels over packed snow, the snowmobile skis are firmly supported by the snow. Consequently, the floatation of the ski on the snow is of little concern in trail riding. Because of this, narrow skis are preferably used for trail riding. The narrow skis enhance the quickness with which the snowmobile can be maneuvered. The narrow skis also minimize the frictional drag between the skis and the packed snow.

In contrast, mountain riding typically occurs on unpacked snow. In many instances, the unpacked snow may be quite deep. As unpacked (or powder) snow is less supportive than packed snow, snowmobiles equipped for mountain riding preferably include wide skis to enhance the floatation of skis on the snow. Specifically, skis for mountain riding typically are widened toward the inside so that extra flotation is provided to the ski. However, skis for mountain use are typically not widened toward the outside, because mountain riding requires of the snowmobile on the mountain as the snowmobile climbs the mountain. During side-hilling, the outside of the ski opposite to the direction of turning is relied upon to execute the turn. This turn maneuver is assisted by a runner, which is attached to the ski generally below the axis of rotation of the ski. Because any extra width at the outside of the ski does not benefit the ability of the ski to execute a side hill turn maneuver (but, instead hinders turning), the ski is widened only at an inside portion.

Like mountain riding, utility riding also requires that the skis on a snowmobile provide a high degree of floatation. Utility use of a snowmobile often involves the transporting of goods or people either directly on the snowmobile itself or on a trailer towed behind the snowmobile. Wide skis ensure enough floatation to the snowmobile to prevent the skis from digging into the snow under the extra weight placed on the snowmobile.

Snowmobiles equipped with skis for utility use differ from snowmobiles equipped for mountain use, because side-hilling is not relied upon to turn the vehicle. Since a utility-use snowmobile maneuvers like a trail-use snowmobile (but requires additional floatation because it travels through unpacked snow), both sides of the skis may be widened to provide as much floatation as possible.

In the prior art, there are only two ways known to alter the width of the skis on a snowmobile. The first is to install entirely new skis specifically designed for the particular use contemplated for the snowmobile. The second is to install on the bottom of the skis a product known as "skins."

Skins are plastic attachments that are wider than typical trail skis. Skins attach to the bottom of trail skis and substantially cover the entirety of the bottom of the skis to which they are attached. Naturally, because they are designed to change the flotation capacity of the skis to which they are attached, skins are generally wider than trail skis. As attachments, skins may be designed as wide or as narrow as required for a particular type of riding condition.

Skins, however, are not easily attached to the bottom of skis. To the contrary, the runner on the bottom of the ski must be removed before the skin may be positioned against the bottom of the ski. The runner is then replaced on the ski and the ski is replaced on the snowmobile. The runners hold the skins to the skis.

Typically, skins enhance the width on both sides of the skis to which they are attached. As a result, skins are typically used only on utility snowmobiles and are not used for trail or mountain snowmobile use.

For the most part, skins are manufactured from plastic. Snowmobile riders prefer plastic because it has a relatively low coefficient of friction when moving across snow. Because of this, skins have also been created to attach to the bottom of steel skis, which have a higher coefficient of friction when traveling over snow.

To date, the prior art lacks a ski design that may be used for all three riding conditions. A need has developed for such a snowmobile ski. In particular, a demand has arisen for a ski adaptable to all three common snowmobile use situations, which are trail use, mountain use, and utility use.

SUMMARY OF THE INVENTION

It is, therefore, an object of the invention to provide a snowmobile ski that is adaptable for trail, mountain, and utility use.

In furtherance of this object, one aspect of the present invention is to provide a snowmobile ski that is easily adjustable in width.

Another aspect of the present invention is to provide a ski that is adjustable in width on only the inside so that the ski may be adapted for mountain use.

Still one other aspect of the present invention is to provide a ski that is adjustable in width on both sides so that the ski may be adapted for utility use.

Another aspect of the invention is to provide a snowmobile ski which includes an elongate ski element. The elongate ski element has a tip and a tail defining a length therebetween, top and bottom surfaces, first and second lateral edges extending longitudinally between the tip and the tail defining a width therebetween, and an attachment flange extending upwardly from the top surface. At least one lateral extension element is detachably secured to one of the lateral edge. At least one fastener releasably secures the at least one lateral extension element to the elongate ski element.

DETAILED DESCRIPTION OF THE PREFERRED EMBODIMENTS

Figure 1:
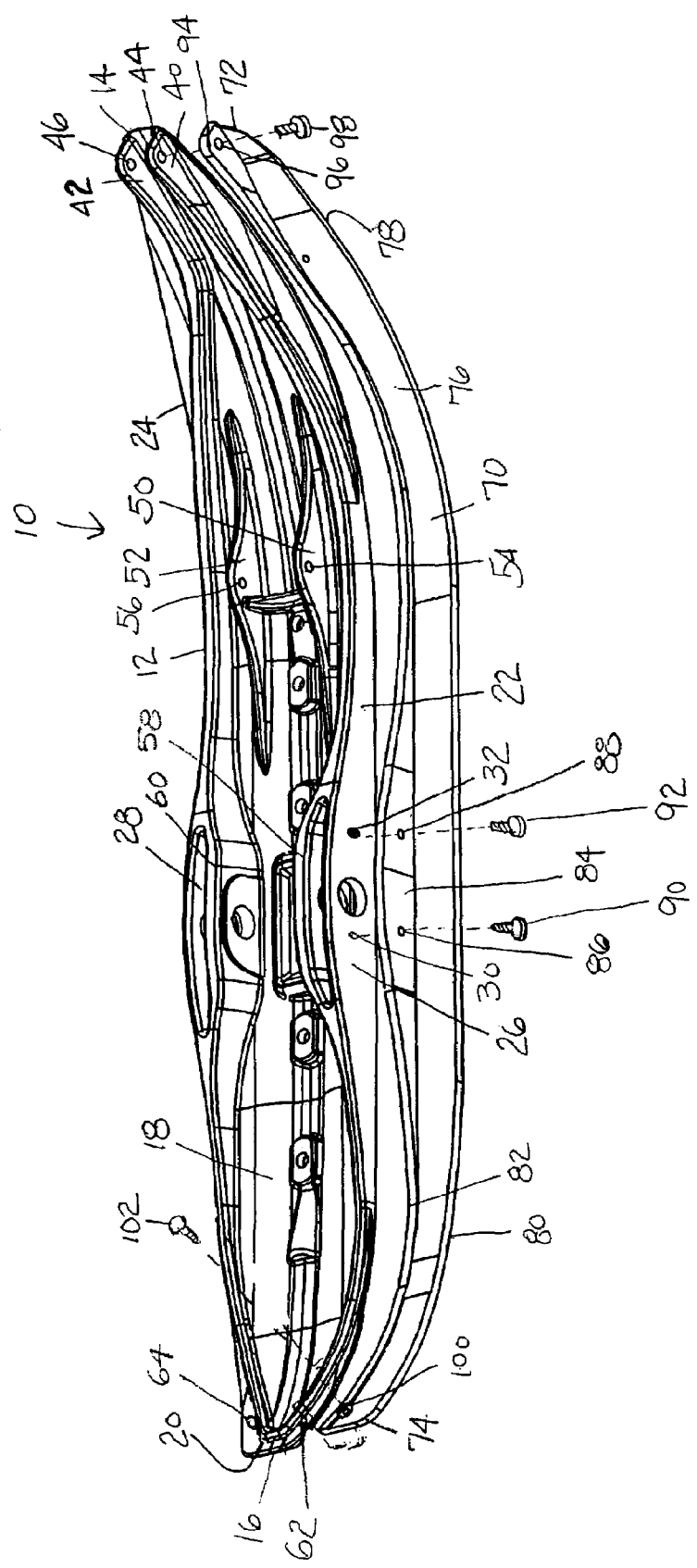
FIG. 1 is a perspective view of a preferred embodiment of the snowmobile ski of the present invention.

FIG. 1 shows the snowmobile ski 10 of the present invention. The snowmobile ski 10 comprises an elongate ski element 12 having a tip 14 and a tail 16 defining a length therebetween. The ski 10 also includes a top 18, a bottom 20, a first lateral edge 22, and a second lateral edge 24. The first and second lateral edges 22 and 24 extend longitudinally between the tip 14 and the tail 16. The first and second lateral edges 22 and 24 define a width therebetween of the elongate ski element 12.

The first lateral edge 22 includes an attachment flange 26 that extends upwardly from the top 18. The second lateral edge 24 preferably also includes an attachment flange 28 that also extends upwardly from the top 18. Both attachment flanges 26, 28 preferably include holes 30, 32, which allow the attachment of extensions thereto to selectively increase the width of the ski 10. While only holes 30, 32 are illustrated for the attachment flange 26, it should be understood that attachment flange 28 preferably includes a similar pair of holes. Moreover, as would be understood by those skilled in the art, the holes 30, 32 are not the only means to attach extensions to the ski 10. To the contrary, other attachments will be known readily to those skilled in the art.

The ski 10 also includes upwardly extending flanges 40 and 42 disposed at the tip 14. The flange 40 includes an opening 44 and the flange 42 includes an opening 46. The flanges 40, 42 preferably are disposed adjacent one another so that the holes 44, 46 are aligned with one another.

Upwardly extending flanges 50 and 52 are disposed at a spaced-apart relationship from the flanges 40 and 42 toward the tail 16 of the ski 10. The flange 50 includes an opening 54 and the flange 52 includes an opening 56. As illustrated, the flanges 50, 52 preferably are disposed adjacent to one another so that the openings 54, 56 are aligned with one another.

While not illustrated, the flanges 40 and 42 are preferably used to secure a first end of a handle to the tip 14 of the ski 10. The handle is disposed at the tip 14 of the ski 10 to permit a rider of the snowmobile to lift upward on the ski 10 after dismounting from the snowmobile. As any snowmobile rider will appreciate, snowmobiles may be driven into areas where a sharp turn is required. Since snowmobiles typically have a relatively large turning radius, the rider may be required to get off of the snowmobile and manually turn the vehicle in the preferred direction. Handles at the tips 14 of each ski 10 facilitate manual turning of a snowmobile, when needed.

Preferably, the first end of the handle is secured to the ski 10 by a fastener that extends through the openings 44, 46. In the embodiment illustrated in FIG. 1, the fastener is the combination of a nut and a bolt. As would be understood by those skilled in the art, however, any alternative fastener may be used. The handle preferably extends from the flanges 40, 42 to the flanges 50, 52, which are used to secure the second end of the handle to the ski 10. Like the first end of the handle, the second end is secured to the ski 10 preferably by a fastener such as the combination of a nut and bolt. As before, those skilled in the art will readily recognize that this is but one type of fastener that may be used. The fastener preferably extends through the holes 54, 56 in the flanges 50, 52 to secure the second end of the handle to the tip 14 of the ski 10.

Upwardly extending flanges 58 and 60 are disposed inwardly of attachment flanges 26 and 28. Specifically, flange 58 is disposed inwardly of flange 26 at a spaced apart distance from flange 26. Flange 60 is disposed inwardly of flange 28 at a spaced apart distance from flange 28. The flanges 58 and 60 are used to secure the ski 10 to one of the ski legs (not shown) on a snowmobile.

Also as illustrated in FIG. 1, a first substantially vertical hole 62 is disposed at the tail 16 of the ski 10 at a position proximate to the first lateral edge 22. A second substantially vertical hole 64 is disposed at the tail 16 at a position proximate to the second lateral edge 24.

As the perspective view in FIG. 1 illustrates, a lateral extension element 70, which is shown separated from the elongate ski element 12, may be attached to the outside lateral edge 22 of the ski 10. The lateral extension element 70 includes a tip 72 and a tail 74 defining a length therebetween. The lateral extension element 70 has top 76 and bottom 78 surfaces, a first lateral edge 80, and a second lateral edge 82. The first and second lateral edges 80 and 82 extend longitudinally between the tip 72 and the tail 74. The first and second lateral edges 80 and 82 define the width of the lateral extension element 70.

The second lateral edge 80 includes an attachment flange 84 that extends upwardly from the top surface 76. The attachment flange 84 includes substantially horizontal holes 86 and 88, which preferably align with holes 30, 32 in the flange 26. To secure the lateral extension element 70 to the elongate ski element 12, the fasteners 90, 92 (preferably screws) extend through the holes 86, 88 and threadedly engage the holes 30, 32.

While fasteners 90, 92 are preferably are screws, those skilled in the art will readily recognize that any alternatie fastener may be used. Regardless of the fastener chosen, preferably the fastener permits removable attachment of the lateral extension element 70 to the elongate ski element 12. As shown, the fastener 90 is releasably secured in holes 86 and 30. Similarly, the fastener 92 is releasably secured in holes 88 and 32.

An upwardly extending flange 94 is disposed proximate to the tip 72. The upwardly extending flange 94 includes a substantially horizontal hole 96. The flange 94 preferably abuts against the flange 40 when the lateral extension element 70 abuts against the lateral edge 22 of the ski element 12. To secure the lateral extension element 70 to the ski element 12 at the tip 14 of the ski, a fastener 98 preferably extends through the flange 94 into the flange 40. In the preferred embodiment, the fastener 98 extends through the holes 96 and 44, secures the tip of the lateral extension element 70 to the tip 14 of the ski, and also secures the first end of the handle to the ski 10. While the fastener 98 is shown as a screw, those skilled in the art will readily recognize that any alternative fastener may be used instead.

The tail 74 includes a substantially vertical hole 100. In the preferred embodiment illustrated in FIG. 1, a fastener 102 extends through the hole 100, as well as through the hole 62 disposed proximate to the tail 16 of the elongate ski element 12. The fastener 102 connects the tail of the lateral extension element 70 to the elongate ski element 12 at the tail 16 of the ski 10.

Upon the releasable securement of the lateral extension element 70 to the elongate ski element 12, the width of the snowmobile ski 10 is increased. At the approximate midsection location where the attachment flange 84 is secured to the attachment flange 26, the width of the ski 10 is increased by an amount equal to the width of the lateral extension element 70. However, the tip 72 and tail 74 of the lateral extension element 70 overlap the tip 14 and tail 16 of the elongate ski element 12. Consequently, the width of the snowmobile ski 10 does not increase at the tip and tail as much as the increase in width at the mid-section of the ski 10. It is, however, understood that other configurations of the lateral extension element are contemplated within the scope of the invention that could extend the lateral width of the ski in the tip and/or tail sections as much or more than the mid-section, if such a configuration is desired.

The holes 26, 32, 40, 46 in the elongate ski element 12 and the holes 86, 88 and 96 in the lateral extension element 70 are preferably disposed in a substantially horizontal orientation. It is preferable to not have fasteners in most portions of the ski 10 that are disposed in a vertical orientation. The reason for this is simple. Vertically oriented fasteners must extend through the ski 10 so that a portion of the fastener extends beneath the bottom 20 of the ski 10. With such an orientation, the portion of the fastener that extends beneath the bottom 20 of the ski 10 potentially is a source of undesirable friction between the snowmobile ski and the snow. Horizontally disposed fasteners such as 90, 92, and 98 are not a source of friction and, therefore, are preferred.

Despite this preference, the vertical orientation of the fastener 102 in the tail 16 of the ski, as is shown in FIG. 1, is acceptable. The reason for this is that the tail 16 of the ski 10 is elevated above the surface of the snow. Accordingly, the fastener 102 typically does not contact the snow. As a result, the vertically-oriented fastener 102 does not impede the progress of the ski 10 as it travels over the snow.

It is understood that a variety of fastening devices other than threaded fasteners could be used to attach the lateral extension 70 element to the elongate ski element 12 and that the particular fasteners described need not be used to practice the present invention.

Figure 2:
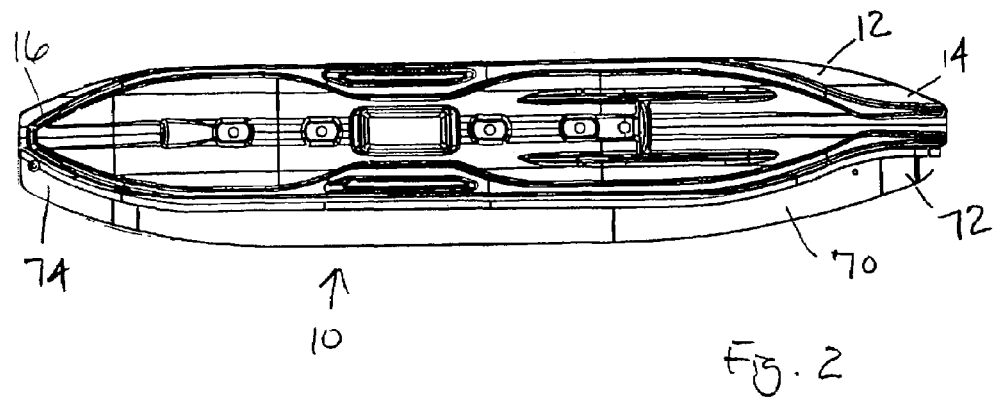
FIG. 2 is a top view of the snowmobile ski shown in FIG. 1.

FIG. 2 shows the lateral extension element 70 in a secured position on the elongate ski element 12. As may be appreciated from this figure, the tip 72 and tail 74 overlap a portion of the corresponding tip 14 and tail 16 of the elongate ski element 12. Accordingly, the width of the ski 10 has been extended less at the tip and tail than at the mid-section, where less (or no) overlap occurs.

Figure 3:
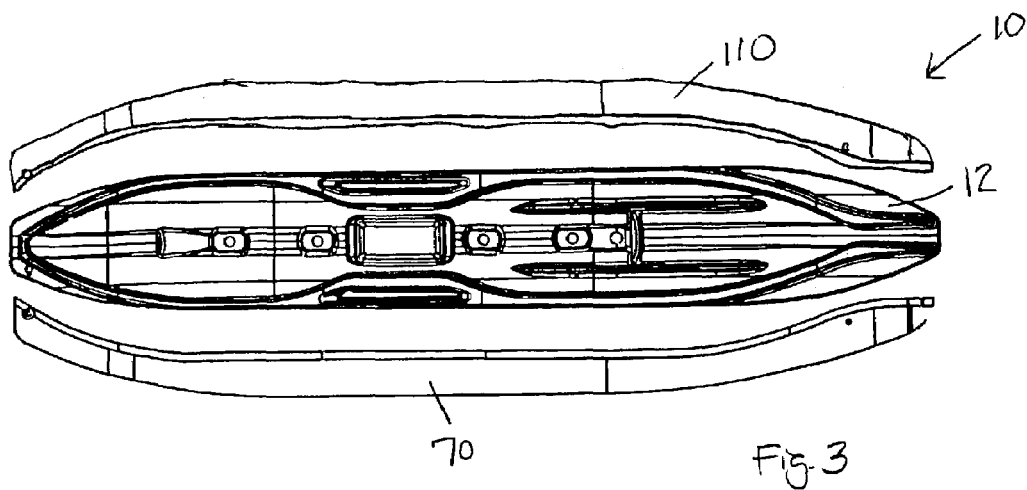
FIG. 3. is a top view of a second configuration of the snowmobile ski shown in FIG. 1.

FIG. 3 shows the elongate ski element 12 with a second lateral extension 110 disposed on the side of the ski 10 opposite to the side having lateral extension element 70. This ski configuration is preferred for utility applications where as much ski floatation as possible is desirable. The lateral extension element 110 preferably is releasably secured to the elongate ski element 12 in the same manner described for the lateral extension element 70.

The snowmobile ski of the present invention is preferably made from a molded plastic or composite material but could also be made from steel, aluminum or other materials using a variety of manufacturing techniques. And, as would be known to one skilled in the art, the snowmobile ski could be made in any shape and from any suitable material(s) capable of withstanding the forces experienced in the environment in which the snowmobile ski is designed to operate.

While the invention has been described with reference to a preferred embodiment, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile ski comprising:
    an elongate ski element having a tip and a tail defining a length therebetween, top and bottom surfaces, first and second lateral edges extending longitudinally between the tip and the tail defining a width therebetween;
    at least one lateral extension element detachably secured to the ski, the lateral extension element having a bottom surface configured to extend the bottom surface of the ski element beyond one the lateral edges thereof so as to increase the width of the ski element,
        the lateral extension element defining a maximum width increase by which the lateral extension element increases the width of the ski element,
        the lateral extension element defining at each point along a longitudinal length of the lateral extension element a downward extension distance by which the lateral extension element extends downwardly below the bottom surface of the ski element;
        wherein over a majority of the longitudinal length of the lateral extension element, the downward extension distance is less than the maximum width increase by which the lateral extension element increases the width of the ski element; and
    at least one fastener releasably securing the at least one lateral extension element to the ski.

2. The snowmobile ski of claim 1, wherein the at least one lateral extension element further comprises:
    a top surface,
    a lateral extension attachment flange extending upwardly from the top surface,
    first and second lateral edges defining a width therebetween, and
    a tip and a tail defining the longitudinal length therebetween.

3. The snowmobile ski of claim 2, wherein:
    the elongate ski element further comprises a ski element attachment flange including at least one hole;
    the lateral extension attachment flange includes at least one hole; and
    the at least one fastener removably connects the elongate ski element and the at least one lateral extension element together through the at least one hole in the ski element attachment flange and the lateral extension attachment flange.

4. The snowmobile ski of claim 3, wherein the fastener comprises a threaded fastener.

5. The snowmobile ski of claim 3, wherein the ski element attachment flange is one of the lateral edges of the elongate ski element.

6. The snowmobile ski of claim 3, wherein the attachment flange of the elongate ski element is adapted to attach the ski to a steering element of a snowmobile.

7. The snowmobile ski of claim 3, wherein the at least one fastener is a bolt that is adapted to simultaneously secure the ski to a ski leg.

8. The snowmobile ski of claim 2, wherein:
    the ski element attachment flange is substantially in the same plane as one of the elongate ski element lateral edges; and
    the at least one lateral extension attachment flange is substantially in a same plane as one of the at least one lateral extension element lateral edges.

9. The snowmobile ski of claim 2, wherein the length of the at least one lateral extension element is substantially equal to the length of the elongate ski element.

10. The snowmobile of claim 2, wherein the at least one lateral extension element progressively increases the width of the elongate ski element from the tip toward the tail and also from the tail toward the tip such that a maximum width is obtained between the tip and the tail.

11. The snowmobile of claim 2, where a portion of the bottom surface of the at least one lateral extension element and a portion of the bottom surface of the elongate ski element are overlapping.

12. The snowmobile ski of claim 1, wherein the bottom surface of the at least one lateral extension element is at least partially coplanar with the bottom surface of the elongate ski element.

13. The snowmobile ski of claim 1, wherein the elongate ski element and the at least one lateral extension element are made from plastic.

14. The snowmobile ski of claim 1, wherein the at least one lateral extension element attaches to the tip and tail of the elongate ski element attachment.

15. The snowmobile ski of claim 1, wherein the at least one lateral extension element is a first lateral extension element configured to extend the bottom surface of the ski element beyond the first lateral edge thereof; the ski further comprising a second lateral extension element having a bottom surface configured to extend the bottom surface of the ski element beyond the second lateral edge thereof so as to increase the width thereof.

16. The snowmobile ski of claim 15, further comprising:
- a first ski element attachment flange at the first lateral edge; and
- a second ski element attachment flange at the second lateral edge.

* * * * *